Jan. 28, 1969 C. A. YOUNG 3,424,874

WIRE IDENTIFIER

Filed March 3, 1966 Sheet 1 of 6

INVENTOR
C. A. YOUNG
BY Leo Stanger
ATTORNEY 3,424,874

WIRE IDENTIFIER

Charles A. Young, Scotch Plains, N.J., assignor to Bell Telephone Laboratories, Incorporated, New York, N.Y., a corporation of New York Filed Mar. 3, 1966, Ser. No. 531,491
U.S. Cl. 179—175.3 14 Claims
Int. Cl. H04b 3/46

This invention relates to testing apparatus, particularly for identifying which pair of wires in one location along a multiwire telephone cable, such as in a cable splice, corresponds to the wires selected at another location, such as at the terminal board in a telephone switching station.

Such apparatuses help to connect the wires and to identify trouble spots within a system. Hitherto-available wire-identifying apparatuses have been operated by generating a continuous signal in the selected wires at the selecting location, and then checking the wires pairs at the identifying location one by one with a capacitive probe until the latter finds the particular wires carrying the generating signal. Tests with such apparatuses are time-consuming. This is especially so when the cable contains several hundred wires.

Moreover, tests with such apparatuses tend to interfere with telephone communication or other use of the cable. Each test requires the generation of a signal along the wires to be tested for a long enough time to permit maintenance men at each location to communicate with each other concerning the existence of the signal, and to permit the maintenance men at the identifying location to probe among perhaps one hundred wires, from wire to wire until the ones carrying signal are found. This may cover a considerable time period. While such tests often are made while there exists no actual communication in the wires, the long test period makes it likely that a subscriber would attempt to use the wires during the tests. While some of the interference characterizing the test procedure can be minimized during a subscriber's use by applying a simplex signal across a pair of wires, that is by applying the identical signal at each wire of a wire pair so that the voltage between the wires is always zero, this has not been completely successful. The simplex arrangement is not perfect. The tests still degrade performance, sometimes for long periods.

Aside from these difficulties, such devices suffered from requiring different apparatuses for performing the different functions in the test procedure.

An object of the present invention is to improve test apparatuses of this type particularly for the purpose of avoiding these difficulties.

Another object of the invention is to minimize the time required for performing such tests, especially so as to minimize the amount of time during which a wire or pair of wires carries test signals.

Still another object of the invention is to simplify the probing procedure by which an operator can identify the selected pair, particularly to minimize the searching time.

Yet another object of the invention is to unify the functions of the test apparatus into a single device capable of performing any of the functions necessary at any of the locations in this test procedure.

According to the invention these ends are achieved not by applying a signal to the wires at the selecting location but by simply connecting the output of an amplifier system at this location, and connecting the input of the amplifier system to a probe that searches for the wires at the identifying location, while giving the amplifier system sufficient amplification to generate oscillations as the probe comes close enough to the wires to be identified to capacitively form a regenerative loop.

According to the invention the wires to be identified carry no signal until the probe actually approaches these wires and forms a capacitive path that closes a loop in the high-power amplifier system. It is only then that signal oscillations actually occur. Since as the probe gets closer to the wire the capacitance between itself and the wires to be identified becomes greater, the loop impedance decreases and the signals become louder. This loudness is intensified not only by the proximity of the probe to the source of signals, but by the signals themselves increasing due to this proximity. A sharp degree of "homing" results. This guides the probe to the selected wires without the need to test all pairs.

Depending upon the physical needs the amplifier system can be composed of two amplifier parts, one at each location connected by a so-called "talking pair" of normally idle wires in the cable. Such a talking pair may be eliminated when "toning around a loop," that is where the cable returns upon itself and the two locations, although far apart when following the cable are actually close together. This may happen when one cable passes to a switching station and then returns along the same path from the switching station. A single amplifier is then possible.

According to another feature of the invention the amplifier and probe are assembled in the same piece of apparatus with various connecting devices and function switches so that identical assemblies may be used at either location and their functions determined by the switches.

These and other features of the invention are pointed out in the claims. Other objects and advantages of the invention will become obvious from the following detailed description when read in light of the accompanying drawings wherein:

Figure 1:
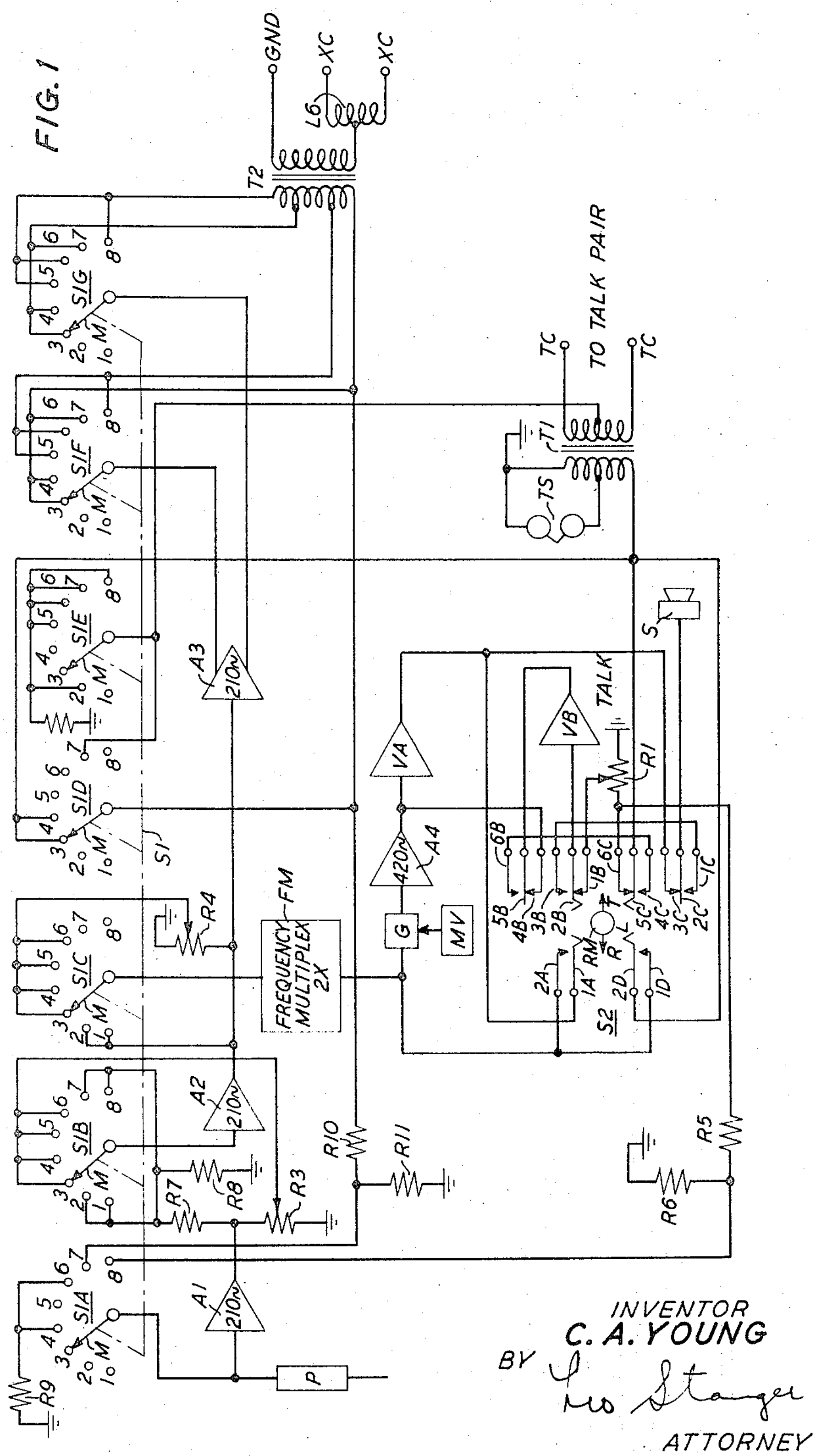
FIG. 1 is a block diagram of a universal wire identifier for use either alone in "toning around a loop," or as one of a pair of identifiers at two locations, and embodying features of the invention.

In FIG. 1 a switch S1 having seven decks S1A, S1B, S1C, S1D, S1E, S1F and S1G, and having seven armatures M each coacting with the others to contact one of eight contact positions of each deck, controls the interconnection of the components in FIG. 1 so as to establish one of eight modes of operation. While on the drawing the contacts on each deck are merely designated 1 through 8, the specification prefixes each contact with its deck reference character so that the contact or the position 3 of deck S1B is designated S1B3.

A three-position switch S2 having an actuating arm RM biased to its center position controls the communication mode of the apparatus. In the rest or center position of the actuating arm RM the respective center leaves 5B, 2B 5C, 2C, 1A and 2D of the switch leaves forming the switch S2 rest against respective leaves or contacts 4B, 1B, 6C and 3C as shown. The remaining contacts remain open. Thus none of the contacts on the left-hand side of the switch S2 as shown are closed and four contacts 6B, 3B, 4C and 1C remain open. Placing the actuating arm RM from the "rest" or "listen" position to the right or "talk" position forces the leaves 5B, 2B, 5C and 2C away from their previous contacts and against the leaves or contacts 6B, 3B, 4C and 1C. The leaves and contacts at the left-hand side of the switch S2 again remain open. Placing the actuating arm RM in the left-hand or ring position returns the leaves 5B, 2B, 5C and 2C into their rest position while pressing the leaves 1A and 2D against contacts 2A and 1D. For simplicity the contact established between any leaf and any contact is designated by the reference characters of that leaf and contact. For example, when leaf 5B rests against the contact 4B the closure is designated 5B–4B. In operation the arm RM is biased to remain in the "listen" or center position.

Placing the armatures M of the function switch S1 in position 1 establishes the identifier in receiver standby mode. In position 2 of the armatures M in switch S1 the identifier is in the transmitter standby mode.

In position 3 the armatures M of switch S1 place the identifier in the capacitive receiver-probe mode. Here a power amplifier A1 tuned to 210 cycles per second amplifies signals in a probe P. The latter extends beyond the cabinet of the identifier and into the cable to be tested. The amplifier A1 passes the signal through a potentiometer R3, through contact S1B3, through a second power amplifier A2 also tuned to 210 cycles per second, and to a third power amplifier A3, similarly tuned to 210 cycles per second. An output of amplifier A3 passes these power amplified 210-cycle signals through contact S1F3 and S1D3 to the transformer T1 and out to contacts TC. A portion of the signal at amplifier A2 passes to the speaker S through a volume control resistor R4, contact S1C3, a frequency multiplier FM, an interrupter composed of a gate G and a seven-pulse-per-second multivibrator MV, a power amplifier A4 tuned to 420 cycles per second, a voice amplifier VA, closure 3C–2C and the speakers. Doubling of the frequency and interrupting it makes the tone more pleasing to the ear.

In position 8 of the armatures M in switch S1 the identifier rests in the transmitter or amplifier mode. Here a 210-cycle signal when it appears on two contacts TC, passes through the transformer T1 and through closure 5C–6C, assuming switch S2 to be in the center of listen position. The 210-cycle signal passes through a 40 db pad composed of resistors R5 and R6, contact S1A8, the amplifier A1, a 30 db pad formed of resistors R7 and R8, contact S1B8, the amplifier A2, the 210-cycle amplifier A3, the contacts S1F8, and S1G8, the taps of the low impedance primary in a transformer T2, to the secondary of the transformer T2. One end of the latter is connected by a lead outside the cabinet to ground. The secondary of transformer T2 terminates at its other end in the center tap of a simplex coil L6 whose ends pass outside the identifier cabinet to two connectors XC adapted to the connector and to the wire pair which has been selected at one location.

Figure 2:
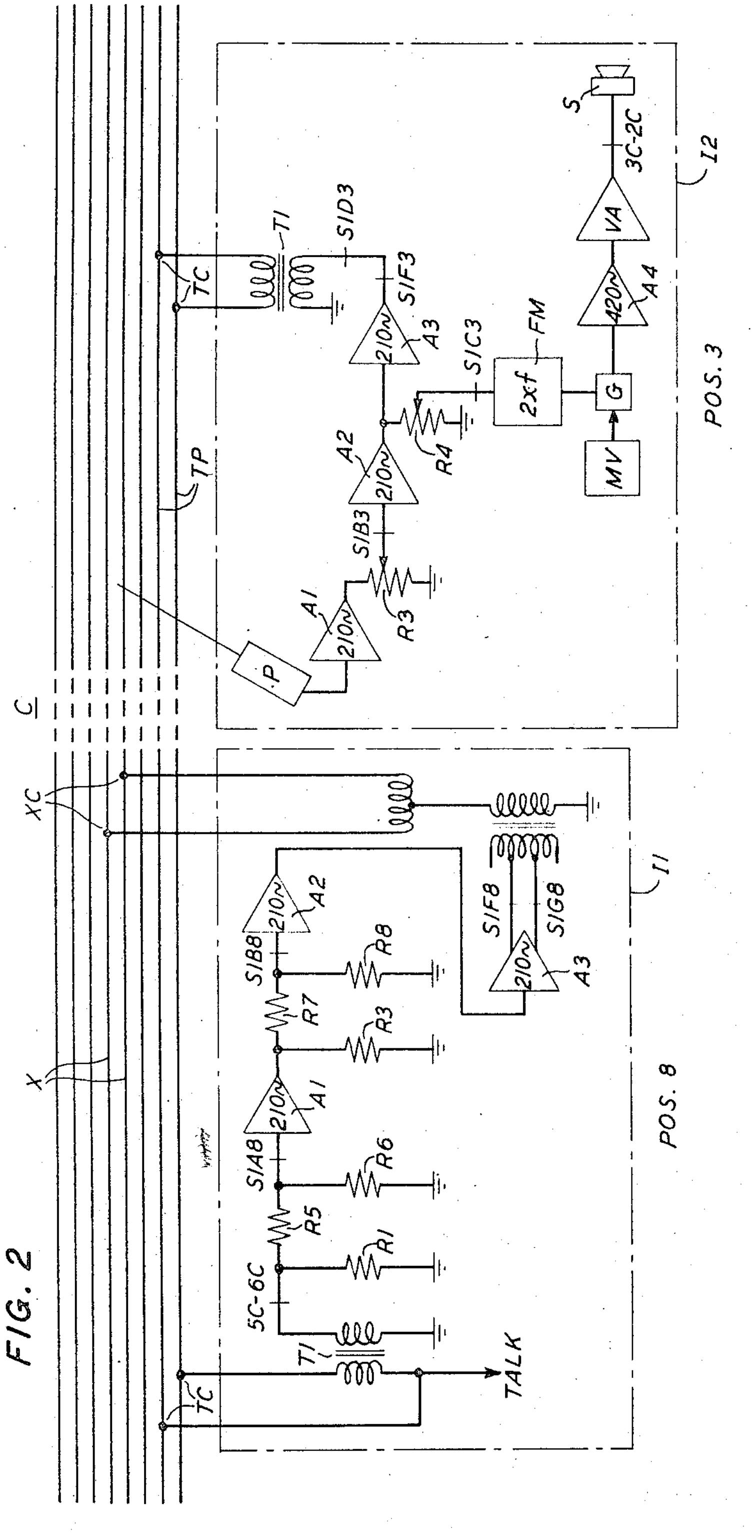
FIG. 2 is a block diagram showing the active identifying portions of two universal wire identifiers each corresponding to FIG. 1, when switched into respective transmitting and receiving modes, and operating to identify two wires at one location which have been selected by the other identifier at another location.

Two identifiers I1 and I2 as shown in FIG. 1 perform in conjunction with each other to identify a selected pair as shown in FIG. 2. Identifier I1 is in the transmit mode. Identifier I2 is in the receiver-probe mode. Here only the components coacting to perform the functional mode in each identifier are shown. The identifier I1 is connected by contacts TC to a so-called talking pair TP that is a spare pair selected for testing, and by contacts XC to a working pair X selected at one location to be identified at the other location. The identifier I2 is connected to the talking pair TP with its own contacts TC. The pair X and the talking pair TP are part of a wire bundle in a cable C that extends from one location to the other. The locations may, for example, be at a splice case and a central switchboard respectively. They may be two splices or they may be two switchboards. As shown in FIG. 2 the amplifier I1 using the reference numerals of FIG. 1 in position 8 comprises the three amplifiers A1, A2 and A3 in cascade applying an output voltage across a selected pair X. The identifier I1 receives its input from the talking pair TP. The latter in turn is connected through the cable C by a transformer T1 across the output of the three cascaded power amplifiers A1, A2 and A3 in the identifier I2. When the probe P is placed near the pair X selected by the identifier I1 the capacitive coupling to this pair forms a loop through the three amplifiers A1, A2 and A3 in the identifier I2 in position three, the talking pair TP and the amplifiers A1, A2 and A3 of identifier I1 as well as the connection through the pair X. This generates oscillations. The closer the probe approaches the pair X the greater the capacitance between the probe and the pair X and the greater the sensitivity of the probe P of identifier I1; thus the greater the signal appearing in the speaker S through the amplifiers A1 and A2, the multiplier FM, the gate G, the amplifier A4, the voice amplifier VA and the closure 3C–2C. The increased capacitance, however, does not only affect the sensitivity of the probe P but also the intensity of the feedback through the talking pair TP, the identifier I1 and the X pair. Thus the oscillations in the entire system and the signals fed to the probe P are also increased. As a result the volume at the speaker C becomes even more intense than the mere increase in voltage at the probe P would normally achieve. In effect the proximity of the probe P to the pair X determines the volume at the speaker S quite noticeably. For this reason an operator can rely upon the volume in the speaker S for determining not only when he has found the pair X, but his proximity to the pair X during his search among the hundred odd pairs that may form part of the cable C. The cumulative effect of proximity to the pair X during the probing process and the increased oscillation affords reliable homing.

The probe need not necessarily be a capacitive probe. The latter is most useful in splices where the conductors or wires are individually insulated or where the conductor connectors are insulated. Where this is not the case and direct contact is available with the wires to be identified, an operator can switch the switch S in identifier I2 to move the armatures M into position 4, which creates a circuit diagram identical to that of FIG. 3 but adds a resistor R9 to provide a low impedance input to the amplifier A1.

Figure 3:
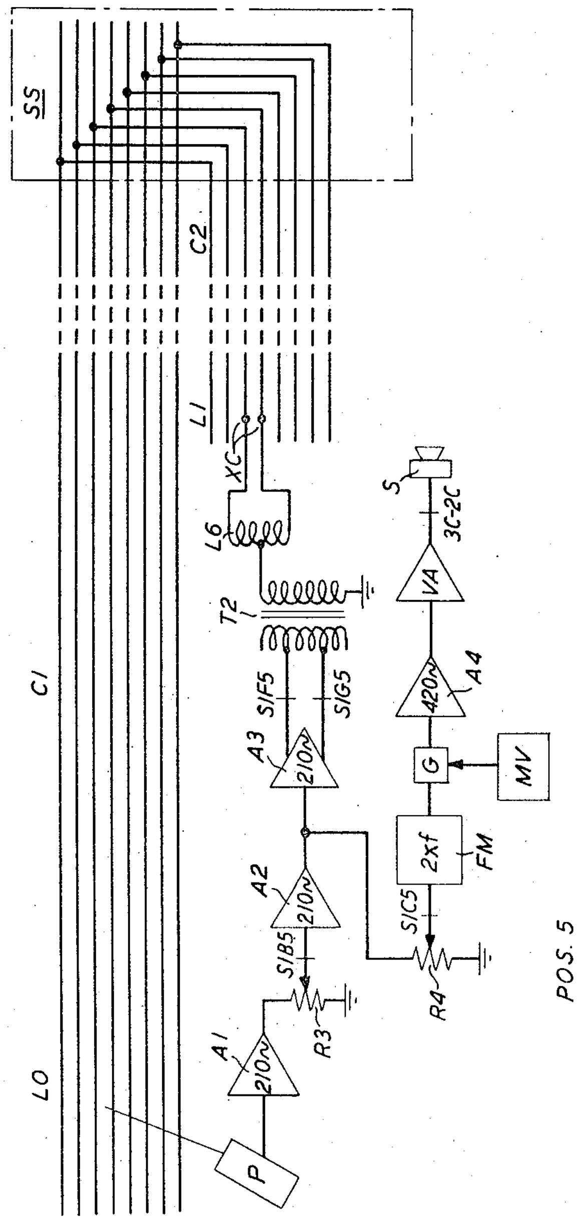
FIG. 3 is a block diagram showing the effective identifying components of the universal identifier in FIG. 1 when switched to the mode of "toning around a loop" and connected to two locations of a cable so as to identify the wire pair selected at one location with the probe at the other location.

Placing the armatures M of function switch S1 into position 5 renders the identifier capable of "toning around a loop." This mode of operation dispenses with the need for an additional identifier and talking pair. It serves when, as shown in FIG. 3, a cable C1 passes from a location L0, such as a splice, to a switching station SS in back to another location L1 close to the location L0. In practice, this involves the cables C1 and C2 being buried in the same trench or hanging adjacent each other from overhead poles.

Figure 5:
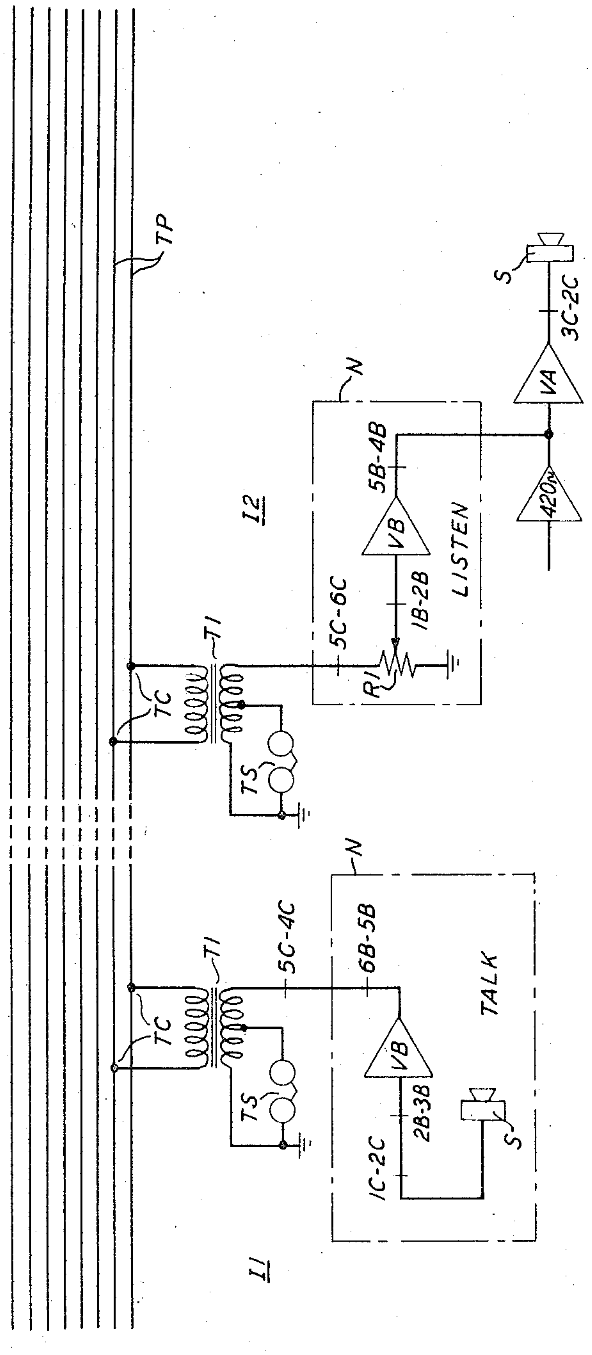
FIG. 5 is a block diagram illustrating the communication portion of two identifiers as in FIG. 1 connected to the talking pair of a cable in the "talking" mode at one position and the "listen" mode at the other position.

As shown in FIG. 5, the connectors XC apply the output of the identifier of FIG. 1 onto the selected pair in the cable C2 at the location L1 and through the simplex coil L6, so that the voltages between the wires of the pair X are zero, since their voltages relative to ground are identical. The probe P approaching the pair X at the location L0 in cable C1, that is, approaching the pair corresponding to the pair X in cable C1, forms a loop that starts with the tuned power amplifier A1 through the spreading resistor R3, the contact S1B5, and the tuned amplifier A2. Cascade connected to the output of amplifier A2 is the amplifier A3. Its output passes through the contacts S1F5 and S1G5 to the low impedance taps in the primary of transformer T2. The secondary of that transformer completes the loop through to ground and the center tap of the simplex coil L6. As the capacitance between the probe P and the pair X becomes great enough, the loop gain becomes sufficient to generate oscillations. The potentiometer R4 taps some of this signal energy off though the switch contact S1C5 to be frequency doubled in the frequency multiplier FM. The resulting 420-cycle signal is repeatedly interrupted by the gate G in multivibrator MV. The amplifiers A4 and VA pass the resulting signal to the speaker S through the closure 2C–3C.

As the probe P approaches the pair X even closer, thereby reducing the capacitance between itself and the pair X, the signal in the speaker S grows louder. However, its intensity increases not only due to the greater sensing ability of the probe P, but because the latter increases the loop gain and further strengthens the oscillations sensed by the probe.

Position 6 of switch S1 connects the resistor R9 across the probe P and ground, thereby permitting the apparatus to tone around the loop conductively.

In the circuit of FIG. 2, where a talking pair is essential for closing the loop between two identifiers, such a talking pair is selected from a number of spares. These are not necessarily coded. Thus, it is necessary to select one spare pair at one location and transmit this information to another location. By placing the armature M of switch S1 into position 7, a maintenance operator can feed the output of the identifier at amplifier A3 back into A1 through the 40 db pad composed of resistors R10 and R11 to make an internal oscillator and apply the oscillatory signal across the idle pair. This is shown by the left-hand identifier in FIG. 4. A second identifier at another location along the cable C can capacitively probe for this signal by placing that identifier in position 1.

Figure 4:
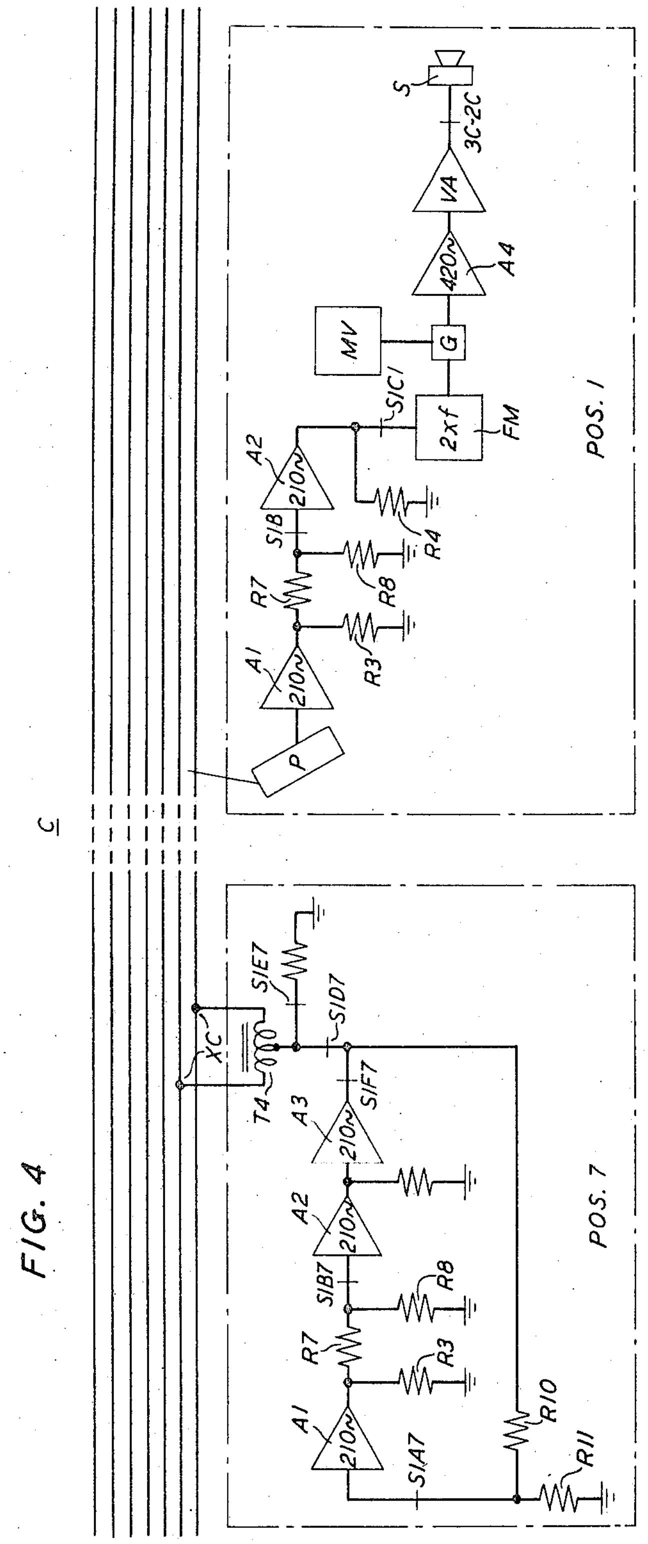
FIG. 4 is a block diagram of the effective portions of two universal identifiers, each shown in FIG. 1, in the respective modes for generating a signal and finding a talking pair operating on two positions along a cable.

The active elements for this operation are shown by the right-hand identifier in FIG. 4. The probe P signal passes through the amplifier A1, the 30 db pad composed of resistors R7 and R8, the contact S1B1, the amplifier A2, the contact S1C1, the frequency multiplier FM, the gate G, the amplifier A4, the voice amplifier VA, the closure 3C–2C, and the speaker S. Probing here, whether in position 8 or 1, is more difficult than in position 3. Bringing the probe P closer to the talking pair TP does not increase the intensity of the generated signal. Thus the change in signal intensity at the speaker S is not enough to furnish satisfactory homing. Identifying in positions 1 and 7 corresponds to the probing procedures of hitherto available identifiers. In position 7 the operation of talk-pair finding corresponds to the probing procedure of hitherto-available identifiers.

FIGS. 2 through 4 omit the talking circuits necessary to establish communication between personnel at the two different locations in FIG. 2. FIG. 5 illustrates the communication portion of the identifiers I1 and I2 appearing in FIG. 2. The portions of this circuit not appearing in FIG. 2 are indicated by N. The remaining components forming part of the communication portions are common, also, to the identifying portions of the identifier. In FIG. 5 the identifier I1 is shown in the talk position formed by pushing the center arm RM to the right in switch S2. The speaker S operates as a microphone and voice signals appearing there pass through closures 1C–2C and 2B–3B before being amplified by the voice amplifier VB. Closures 6B–5B and 5C–4C pass the signal to the output transformer T1. The talk set TS is an auxiliary device which eliminates the need for the talk position where desired. Signals passing from the output transformer T1 pass through the talk pair to the transformer T1 and the identifier I2. The arm RM, by remaining in the center position to which it is biased and which release thereof always places it, establishes the identifier I2 in the listen mode. There the transformer T1 passes the signals appearing in the talk pair through closure 5C–6C, the gain control resistor R1, the closure 1B–2B, to the amplifier VB. The amplifier VA passes the signals to the speaker S after receiving them through closure 5B–4B and through closure 3C–2C.

Thus, personnel at one end may talk to personnel at the other end simply by placing the arm RM into talking position and directing their language at the speaker S. The signals pass through the voice amplifier VB in identifier I1, through the transformer T1, through the talking pair, through the transformer T1 in identifier I2, through the amplifier VB, the amplifier VA, and out the speaker S in identifier I2. If they wish, instead of placing the identifier into talk position as shown in FIG. 5, personnel at the identifier I1 may remove the talk set TS and talk directly. The talk set I2 must remain in the listen position, as before. By reversing the positions of the identifier, namely, by releasing the arm RM so as to allow its return to the listen position at identifier I1, and by personnel pushing the arm RM to the right into the talk position in identifier I2, personnel at the identifier I2 may talk to personnel at identifier I1. A talk set TS at identifier I2 operates in the same manner as a talk set in identifier I1.

Figure 6:
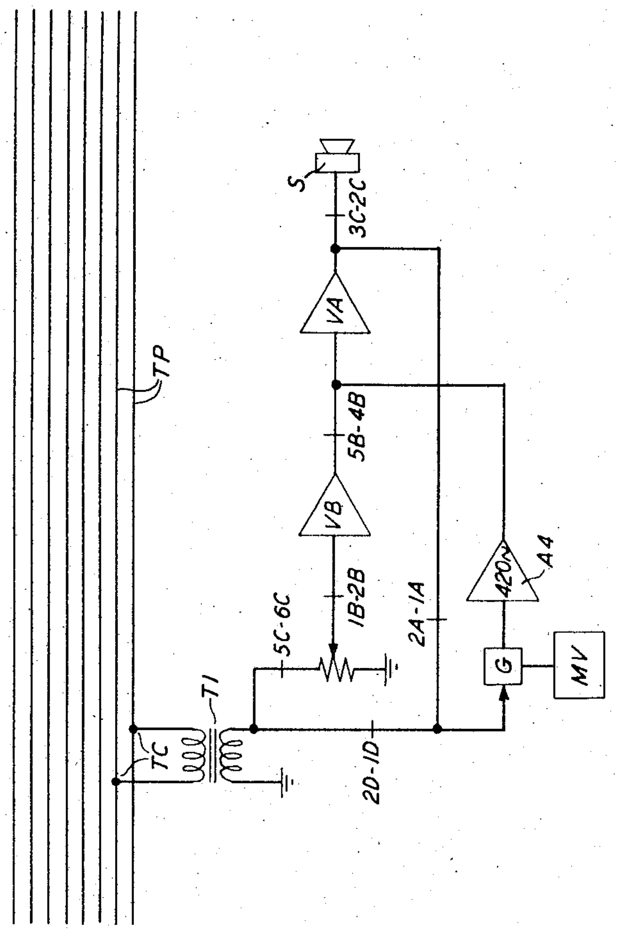
FIG. 6 is a block diagram illustrating the communication portion of the identifier in FIG. 1 connected to the talking pair of a cable and operating in the "ring" mode.

Personnel at either location may ring for each other by forcing respective arms RM into the left or ring positions. The circuit closed in this position appears in FIG. 6. Here the loop formed with the amplifier A4 and the voice amplifier VA produces an oscillatory signal interrupted at seven times per second by multivibrator MV. The switches shown in FIG. 6 correspond to those shown in FIG. 1.

These talk positions and communication positions are applicable for any position of the switch S1.

In FIG. 1 the signal volume control resistor R4 is effectively wired for maximum loss in switch positions 7 and 8, that is it is unconnected, it provides for no loss in switch positions 1 and 2, and adjustable loss in positions 3, 4, 5, and 6 of the armature M of switch S1.

The potentiometer R3 serves as a spreading as well as sensitivity control. When the identifier oscillates, the resistor R3 determines the level at which oscillations begin. It prevents pairs other than the one to which the amplifier or other identifier is connected from becoming regenerative, and thus prevents identification of a wrong pair. In switch positions 1, 2, 7, and 8 the resistor R3 has little effect upon the 30 db pad composed of resistors R7 and R8.

The power amplifiers A1, A2, and S3 all include resonance circuits tuned to 210 cycles per second, with a 3 db bandwidth of 30 cycles per second. This frequency rejection prevents noise signals or talking signals from entering the identifier circuit and interfering with its operation. The frequency multiplier FM has an input stage producing a square function which is passed to a paraphase amplifier that eliminates the odd harmonics while amplifying the even harmonics. The remaining portions of the amplifier tune to 420 cycles per second and reject 210 cycles per second.

The circuit, according to the invention, furnishes a universal apparatus capable of operating together with an identical apparatus at opposite locations in a pair-identifying arrangement or in toning around a loop. The two devices can cooperate to identify a talking pair for future or further testing.

While an embodiment of the invention has been described in detail, it will be obvious to those skilled in the art that the invention may be practiced otherwise without departing from its spirit and scope.

What is claimed is:

1. Apparatus for identifying at one location the wire selected from a number of wires in another location comprising first amplifier means electrically joined at the selecting location to the wire to be identified, second amplifier means located near the location at which the wire is to be identified, electrical means joining the input of one of said amplifying means to the output of the other, probe means for coupling said second amplifying means to the wire to be identified so as to join the output of the one of said amplifying means to the input of the other whereby a feedback loop is formed when said probe so couples said second amplifying means, said two amplifying means having a cumulative amplification sufficient to cause oscillations when said probe so couples said second amplifier to said wire, and detector means for sensing said oscillations.

2. Apparatus for identifying a wire in a cable, comprising capacitive probe means, amplifier means, detector means, connector means for contacting a chosen cable wire, contact means adapted to connect to a selected cable wire; and switch means having one position in which it joins said probe means, said amplifier means, and said connector means in consecutive cascade connection, and also joins said detector means to respond to said amplifier means; said switch means having a second position in which it joins said connector means, said amplifier means, and said contact means in consecutive cascade connection.

3. Apparatus as in claim 2, wherein said amplifier means, while said switch is in its first position, have sufficent amplification to cause regenerative oscillations in conjunction with a second identical apparatus having a switch in the second position when the connector means and said contact means of two separate apparatuses are connected to the chosen and selected wires on the same cable and when said probe approaches the other selected cable wire.

4. Apparatus as in claim 2 wherein said switch has a third position at which it joins said probe means and said amplfier means as well as said contact means into consecutive cascade relation.

5. Apparatus as in claim 2 wherein said amplifier means are tuned to a single frequency.

6. Apparatus as in claim 2 wherein said detector means includes an audio frequency amplifier and speaker and further comprising second switch means having a first position for joining said connector means and said audio frequency amplifier and said speaker in consecutive cascade relation.

7. Apparatus as in claim 6 wherein said second switch means have a second position for joining said speaker and said audio frequency amplifier and said connector means in consecutive cascade relation opposite to that of the first position of said second switch.

8. Apparatus as in claim 7 wherein said second switch means have a third position for connecting said connector means and said audio frequency amplifier and said speaker in consecutive cascade relation, and further comprising interrupter means connected to said audio frequency amplifier.

9. Apparatus for identifying a wire from among many wires comprising: connector means for contacting at one location the wire to be identified at another location, amplifier means, probe means, detector means, and electrical means connecting said probe means and said amplifier means as well as said connector means into consecutive cascade relation, said electrical means connecting said detector means to respond to said amplifier means, said amplifier means having sufficient amplification to cause increasing oscillations in response to said probe means approaching the wire to be identified at the other location.

10. Apparatus as in claim 9 wherein said amplifier means are tuned to a given frequency.

11. Apparatus as in claim 9 wherein said detector means includes an audio frequency amplifier and speaker and further comprising second switch means having a first position for joining said connector means and said audio frequency amplifier and said speaker in consecutive cascade relation.

12. Apparatus as in claim 11 wherein said second switch means have a second position for joining said speaker and said audio frequency amplifier and said connector means in consecutive cascade relation reverse of that at the first position.

13. Apparatus as in claim 12 wherein said second switch means have a third position for connecting said connector means and said audio frequency amplifier and said speaker in consecutive cascade relation, and further comprising interrupter means connected to said audio frequency amplifier.

14. The method of identifying at one location the wire selected from a number of wires at another location, which comprises connecting one end of an amplifying system to the selected wire at the other location, probing for the wire to be identified at the one location with a probe connected to the other end of the amplifying system, detecting oscillations generated when the probe forms a regenerative loop with the wire to be identified and the amplifier, and moving the probe toward the direction at which the detected oscillations becomes stronger.

No references cited.

KATHLEEN H. CLAFFY, *Primary Examiner.*

A. McGILL, *Assistant Examiner.*

U.S. Cl. X.R.

324—66